US008239176B2

(12) United States Patent
Ma

(10) Patent No.: US 8,239,176 B2
(45) Date of Patent: Aug. 7, 2012

(54) SIMULATION METHODS AND SYSTEMS FOR CARRIERS HAVING MULTIPLICATIONS

(76) Inventor: Feng Ma, Cary, NC (US)

(*) Notice: Subject to any disclaimer, the term of this patent is extended or adjusted under 35 U.S.C. 154(b) by 550 days.

(21) Appl. No.: 12/371,574

(22) Filed: Feb. 13, 2009

(65) Prior Publication Data
US 2009/0204381 A1 Aug. 13, 2009

Related U.S. Application Data

(60) Provisional application No. 61/028,475, filed on Feb. 13, 2008.

(51) Int. Cl.
G06G 7/48 (2006.01)

(52) U.S. Cl. ......... 703/2; 703/1; 703/6; 703/12; 257/87; 257/194; 257/199; 257/214

(58) Field of Classification Search ............... 703/6, 13, 703/1, 2, 12; 257/186, 603, 605, 87, 194, 257/199, 214; 438/91, 380
See application file for complete search history.

(56) References Cited

U.S. PATENT DOCUMENTS

| | | | | |
|---|---|---|---|---|
| 4,731,641 A * | 3/1988 | Matsushima et al. | ........... | 257/21 |
| 4,982,255 A * | 1/1991 | Tomita | ............. | 257/21 |
| 5,187,553 A * | 2/1993 | Makita | ........... | 257/187 |
| 5,323,021 A * | 6/1994 | Hasegawa | ............ | 257/37 |
| 5,338,947 A * | 8/1994 | Watanabe | ............ | 257/186 |
| 5,471,068 A * | 11/1995 | Tsuji et al. | ............ | 257/21 |
| 5,579,345 A * | 11/1996 | Kroeger et al. | ............ | 375/344 |
| 5,767,560 A * | 6/1998 | Gofuku | ............ | 257/438 |
| 6,204,087 B1 * | 3/2001 | Parker et al. | ............ | 438/56 |
| 6,437,362 B2 * | 8/2002 | Suzuki | ............ | 257/21 |
| 6,714,620 B2 * | 3/2004 | Caflisch et al. | ............ | 378/65 |
| 6,720,588 B2 * | 4/2004 | Vickers | ............ | 257/186 |
| 7,045,833 B2 * | 5/2006 | Campbell et al. | ............ | 257/186 |
| 7,187,013 B2 * | 3/2007 | Nakaji et al. | ............ | 257/186 |
| 7,345,325 B2 * | 3/2008 | Nakaji et al. | ............ | 257/186 |
| 7,808,015 B2 * | 10/2010 | Itzler et al. | ............ | 257/186 |
| 8,120,079 B2 * | 2/2012 | Augusto | ............ | 257/292 |
| 8,125,813 B2 * | 2/2012 | Nizin et al. | ............ | 365/65 |
| 2001/0020863 A1 * | 9/2001 | Cova et al. | ............ | 327/514 |
| 2003/0047752 A1 * | 3/2003 | Campbell et al. | ............ | 257/186 |
| 2003/0098463 A1 * | 5/2003 | Vickers | ............ | 257/186 |
| 2004/0106265 A1 * | 6/2004 | Vickers | ............ | 438/380 |
| 2006/0017129 A1 * | 1/2006 | Nakaji et al. | ............ | 257/438 |
| 2006/0098565 A1 * | 5/2006 | Maegawa | ............ | 369/275.4 |
| 2006/0175529 A1 * | 8/2006 | Harmon et al. | ............ | 250/207 |
| 2006/0285640 A1 * | 12/2006 | Nizin et al. | ............ | 378/65 |
| 2007/0120226 A1 * | 5/2007 | Nakaji et al. | ............ | 257/603 |
| 2007/0124122 A1 * | 5/2007 | Freier | ............ | 703/2 |
| 2007/0290267 A1 * | 12/2007 | Yoshikawa et al. | ............ | 257/365 |
| 2008/0200126 A1 * | 8/2008 | Okada et al. | ............ | 455/46 |
| 2008/0246863 A1 * | 10/2008 | Furuta et al. | ............ | 348/250 |
| 2008/0246944 A1 * | 10/2008 | Redman et al. | ............ | 356/5.09 |
| 2010/0217570 A1 * | 8/2010 | Charruau | ............ | 703/2 |
| 2011/0108702 A1 * | 5/2011 | Jackson et al. | ............ | 250/207 |
| 2011/0291109 A1 * | 12/2011 | Wraback et al. | ............ | 257/77 |

OTHER PUBLICATIONS

Feng Ma, Ning Li, and J. C. Campell, "Monte Carlo Simulations of the Bandwidth of InAlAs Avalanche Photodiodes" 2003 IEEE, pp. 2291-2294.*

* cited by examiner

Primary Examiner — David Silver
Assistant Examiner — Kibrom Gebresilassie

(57) ABSTRACT

A simulation of a multiplication process includes tracing histories of a plurality of carriers, increasing a weight factor of a carrier to simulate a multiplication of the carrier, and summing the number of the plurality of carriers. Each of the plurality of carriers is multiplied by its respective weight factor.

20 Claims, 5 Drawing Sheets

SIMULATION METHODS AND SYSTEMS FOR CARRIERS HAVING MULTIPLICATIONS

CROSS-REFERENCE TO RELATED APPLICATIONS

This application claims priority of U.S. Provisional Application No. 61/028,475, filed on Feb. 13, 2008, the disclosure of which is hereby incorporated by reference in its entirety.

BACKGROUND OF INVENTION

Many systems involve multiplication processes. For example, population grows through reproduction; monetary investment grows through gains such as stock market gain. In another example, avalanche photodiodes (APDs) operate by multiplying carriers (e.g., electrons and holes) being accelerated by electric fields.

APDs are particularly useful for photon counting, which finds applications in remote sensing, optical communication encryption, astronomy, ballistic missile defense, and ladar applications.

APDs can be operated in the Geiger mode for photon counting. A Geiger-mode APD is biased above its breakdown voltage such that a majority of the carriers (electrons and holes) continue to impact ionize in a runaway fashion, until an external circuit quenches the otherwise infinitely increasing gain. The Geiger mode APDs have may high dark currents (counts), and thus can be more susceptible to space radiations.

It would be useful to simulate Geiger-mode APDs to predict their behaviors such as breakdown (runaway) probabilities as functions of biases. Monte Carlo simulations can potentially provide more insights into the breakdown behaviors of APDs than analytical models, and may be used in designing optimal APD structures. However, conventional Monte Carlo simulations trace every carrier throughout their transport and impact ionization processes. In the Geiger mode, the high gains of the carriers make conventional Monte Carlo simulations computationally prohibitive.

SUMMARY OF INVENTION

In one aspect, embodiments disclosed herein relate to methods, computer readable medium, computer software, and computer systems for simulating a multiplication process, including tracing histories of a plurality of carriers, increasing a weight factor of a carrier to simulate a multiplication of the carrier; and summing the number of the plurality of carriers, wherein each of the plurality of carriers is multiplied by its respective weight factor.

In one embodiment, the multiplication process includes an impact ionization process in an avalanche photodiode (APD), and wherein the plurality of carriers include electrons and holes.

Following an impact ionization event caused by an electron, a new electron and a new hole can be simulated, wherein the new electron can be given a weight factor twice that of the electron.

Following an impact ionization event caused by a hole, a new hole and a new electron can be simulated, wherein the new hole can be given a weight factor twice that of the hole.

A breakdown voltage can be defined for the APD, and a breakdown probability of the APD can be calculated based on the defined breakdown voltage. The breakdown voltage can be defined based on one of a predetermined bias for the APD or a predetermined gain for an individual carrier.

An electrical current from the APD can be simulated, and a filter can be applied to the electrical current to determine a single photo detection probability. The filter can be determined from, for example a resolution of a measurement system, and the resolution can include at least one of an amplitude resolution or a frequency resolution of the measurement system.

Other aspects and advantages of the invention will become apparent from the following description and the attached claims.

DETAILED DESCRIPTION

Embodiments of the present invention are described in detail below with respect to the drawings. Like reference numbers are used to denote like parts throughout for consistency.

Although the methods and systems are described below using a simulation of an APD as an example, the methods and systems can be applied to other simulations such as those of a population study, a finance analysis, an economics model, etc. In these simulations, individual "carriers," e.g., an entity, a stock share, an electron, an individual, etc, are traced throughout their "histories," such as birth, growth, multiplication, etc.

Figure 1:
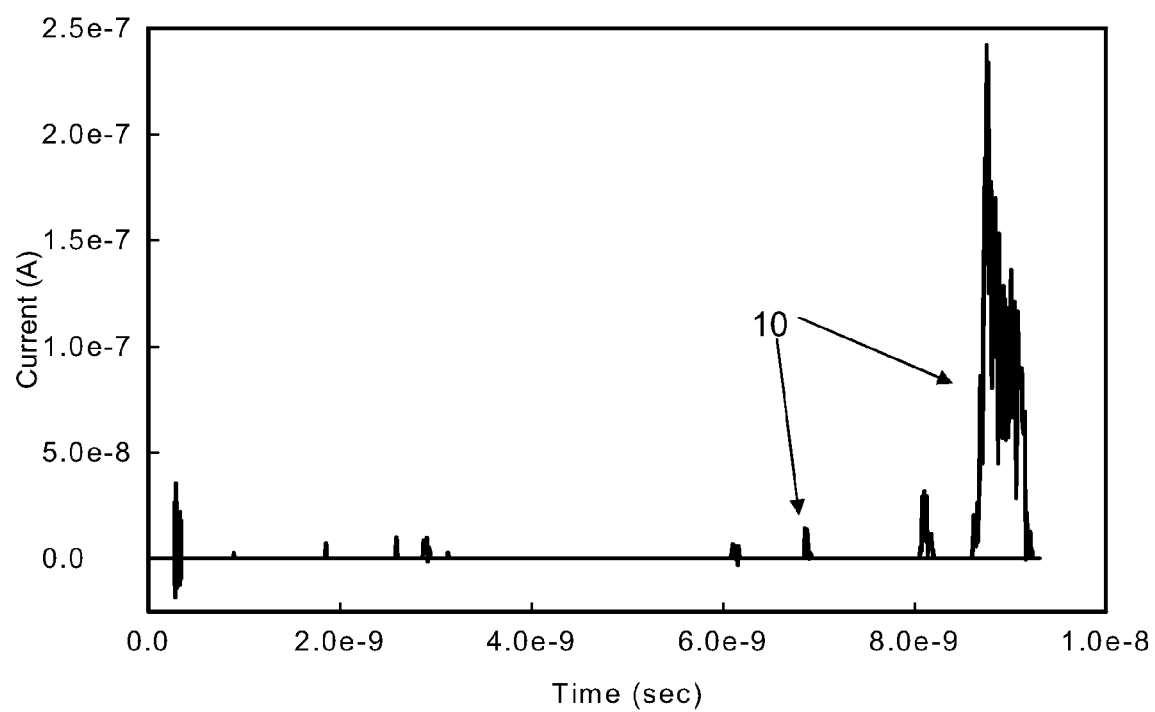
FIG. 1 illustrates simulated current pulses resulting from 10 photons received by an APD biased to an average gain of about 50.

FIG. 1 shows simulated current pulses 10 resulting from an APD biased to an average gain of about 50, i.e., the APD is still in its linear mode. The APD has a thin (~100 nm) InAlAs-based impact ionization region. A total of 10 photons are simulated to be absorbed a thick (~1 μm) InGaAs absorption region. The photon arrival time follows a Poisson distribution. As shown, the pulses resulting from the individual photos have a large range of amplitudes and durations, an expected behavior for APDs operating in linear mode.

The electrical current in the APD is calculated using the well known Ramo's theorem, which states that the total current $I(t)=\Sigma_i q_i v_i/d$, where $q_i$ is the electrical charges of electrons or holes, $v_i$ the carriers' instantaneous velocity, and d is the distance between the p and n layers. The sum is over all carriers in the depletion region, including impact-ionization-generated carriers.

Using the simulated current pulses, in conjunction with known amplitude and frequency resolutions of measurement systems, single photo detection probability can be accurately predicted for a given APD in a given measurement system. Various quenching mechanisms can also be included in the Monte Carlo model. For example, when the current amplitude reaches a predetermined threshold value as determined from laboratory settings, the bias over the APD can be tuned below the breakdown voltage, while electrons and holes are continuously being traced in the simulations.

To more practically simulate APDs operating in the Geiger mode, the total number of carriers can be reduced accepting some sacrifice of statistical accuracy. It is noted that because of the high gains ($>10^4$) of individual carriers, the total number of output carriers is enormous, making carrier number statistics less of an issue.

Some known techniques can be applied to simulations to reduce the total number of carriers. For example, in a technique known as the "Russian roulette," particles moving away from the region of interest are "killed" at a certain probability. If a particle "survives," its weight is increased by a factor inversely proportional to the kill probability. When applied appropriately, Russian roulette leaves Monte Carlo simulation unbiased while reducing the computing time.

Figure 2:
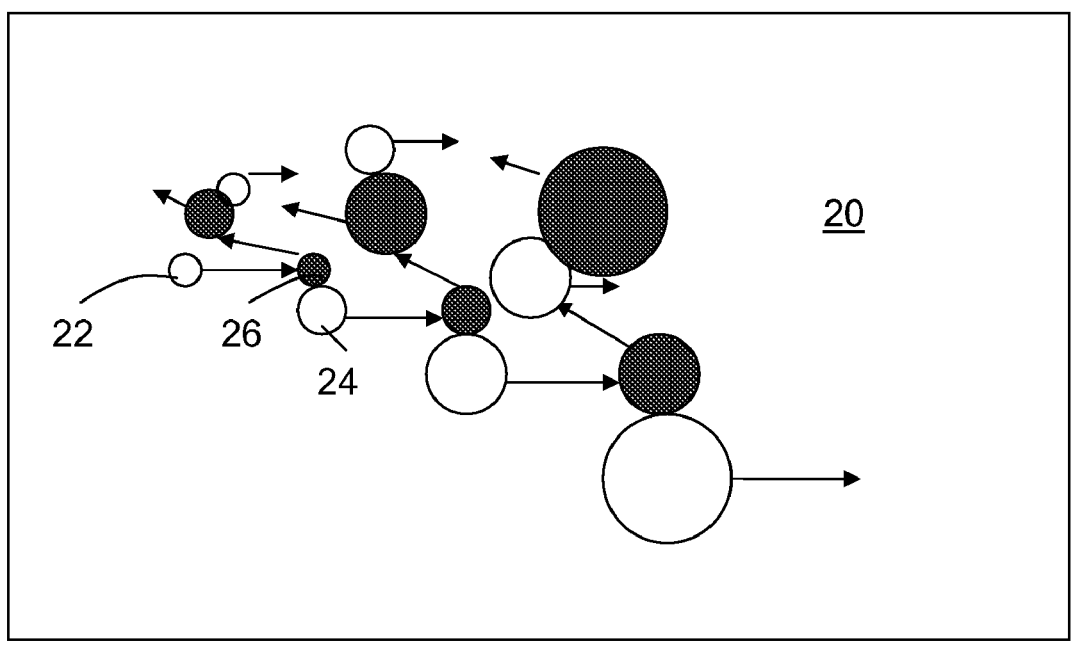
FIG. 2 illustrates a method of reducing the number of carriers being simulated.

In one embodiment as illustrated in FIG. 2, in a depletion region 20, of an APD, when an electron (open circle) 22 causes an impact ionization (multiplication), instead of generating two electrons and one hole (solid circle) as in conventional Monte Carlo simulations, only one electron 24 and one hole 26 are generated. The electron 24 is given a "weight" twice its earlier value (double-sized circle). The weight is carried along in later impact ionizations. The weights of the carriers are applied to the output carrier count and the current, and when summing all the output carriers, each carrier being summed includes its weight accumulated throughout its transport and multiplication history. Thus, the total number of carriers being simulated is drastically reduced, particularly at high gains.

Figure 3:
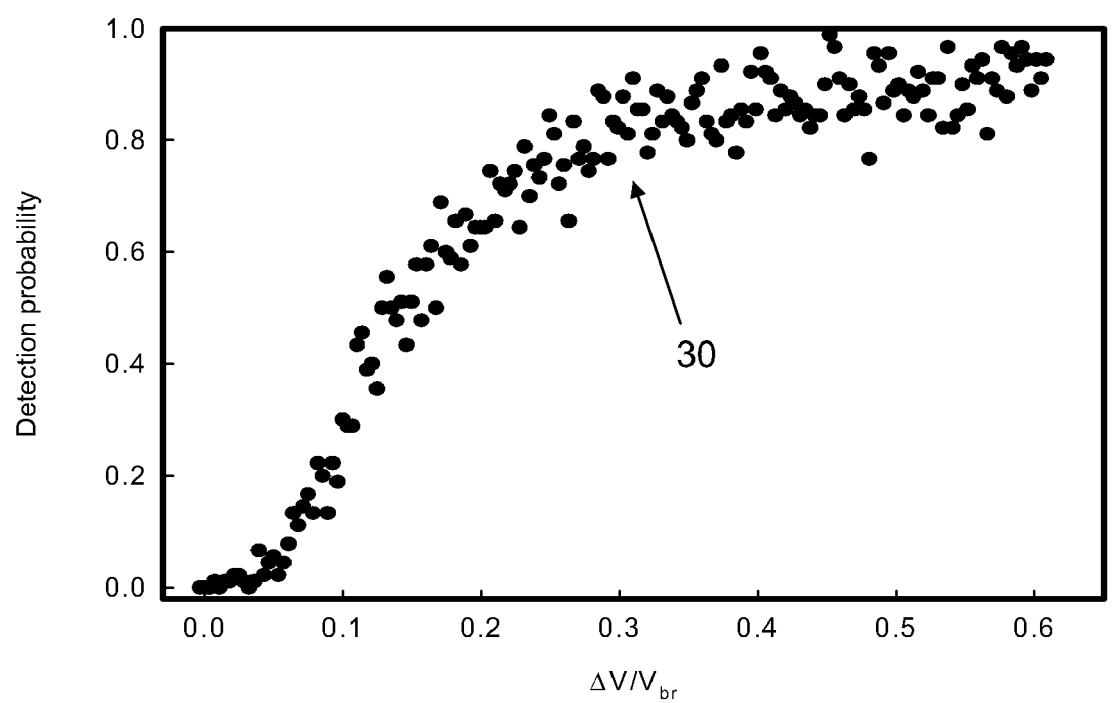
FIG. 3 shows a simulated single photon detection probability.

The methods in accordance with embodiments described herein make Monte Carlo simulations of Geiger-mode APDs more practical. FIG. 3 illustrates one example of a simulated single-photon detection probability. In the simulation, a total of 100 photons are absorbed in the absorption region of the APD, and the photons follow a Poisson distribution in time.

The APD is biased above its breakdown voltage, $V_{br}$, by a factor of $(V-V_{br})/V_{br}$. The $V_{br}$ is set to be, for example, the bias for the APD to reach an average gain of 100. In the following example, a cap for the gains of individual carriers is set to be $g_{th}$=50,000, i.e., when a photoelectron reaches a gain of $g_{th}$, the simulation stops, and the photon is considered "detected" by the single-photon detection system.

The scatters in the simulated data points reflect the stochastic nature of the APD and the simulation itself. The general behavior of the detection probability curve is consistent with measured data. This simulation only takes about 10 minutes on a personal computer. It is conceivable that conventional Monte Carlo simulations would take much longer. For example, for each of the data points 30 in FIG. 3, a total number of 5 million electrons and a similar number of holes would need to be traced when the detection probability is close to 1.

In other embodiments, $g_{th}$ can be set even higher, e.g., 1 million. Current pulses similar to those illustrated in FIG. 1 can be used in conjunction with a given experimental setup including a quenching circuit to simulate the detection probability. Based on the experimental setup, external current quenching can be applied to the simulations, and the photon detection probability can be simulated using a "filter" with known amplitude and frequency resolutions. Such a filter can be applied to the simulated current pulses to calculate the APD breakdown probability, or single-photon detection probability, specific to the APD and specific to the measurement set up.

Figure 4:
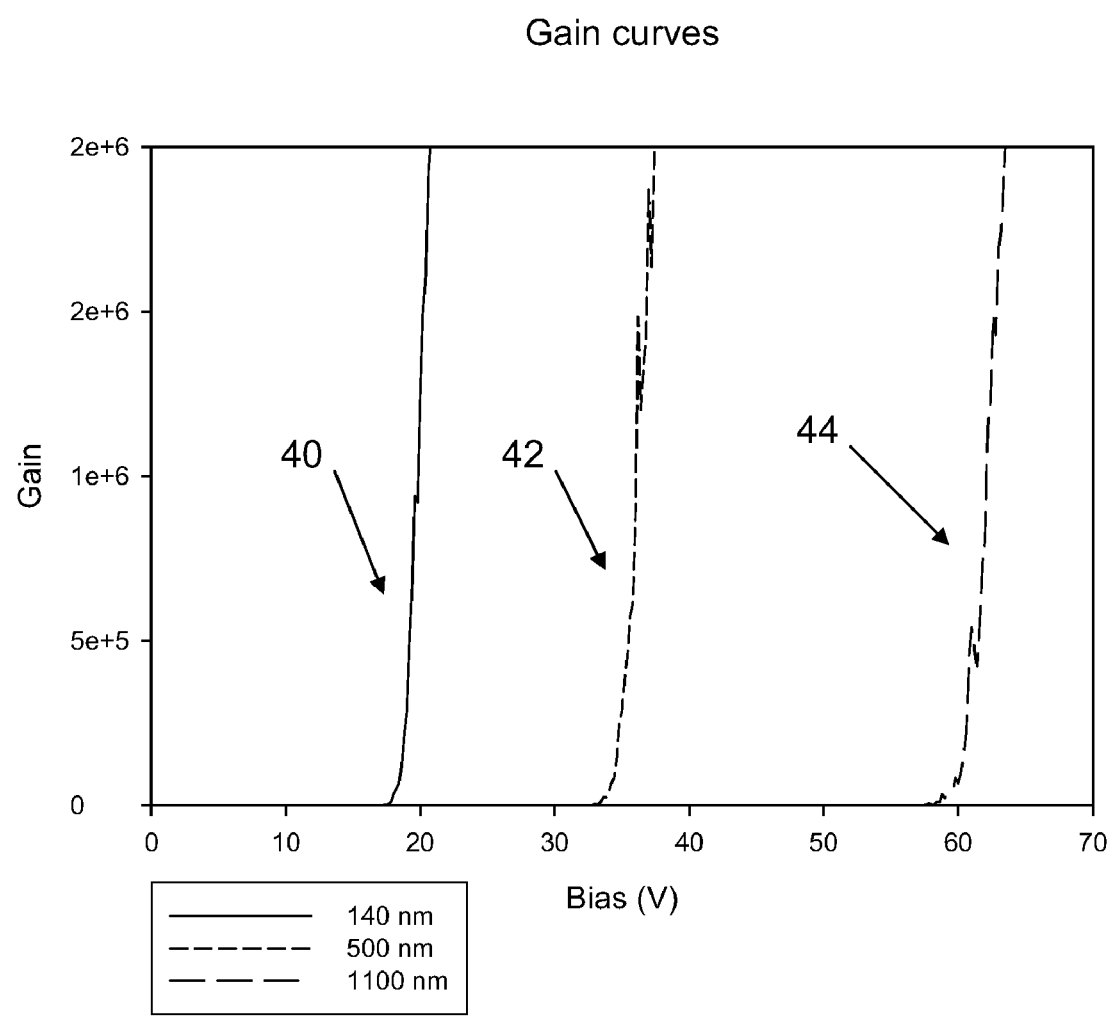
FIG. 4 illustrates gain curves for three APDs simulated using a method in accordance with an embodiment of the invention.
Figure 5:
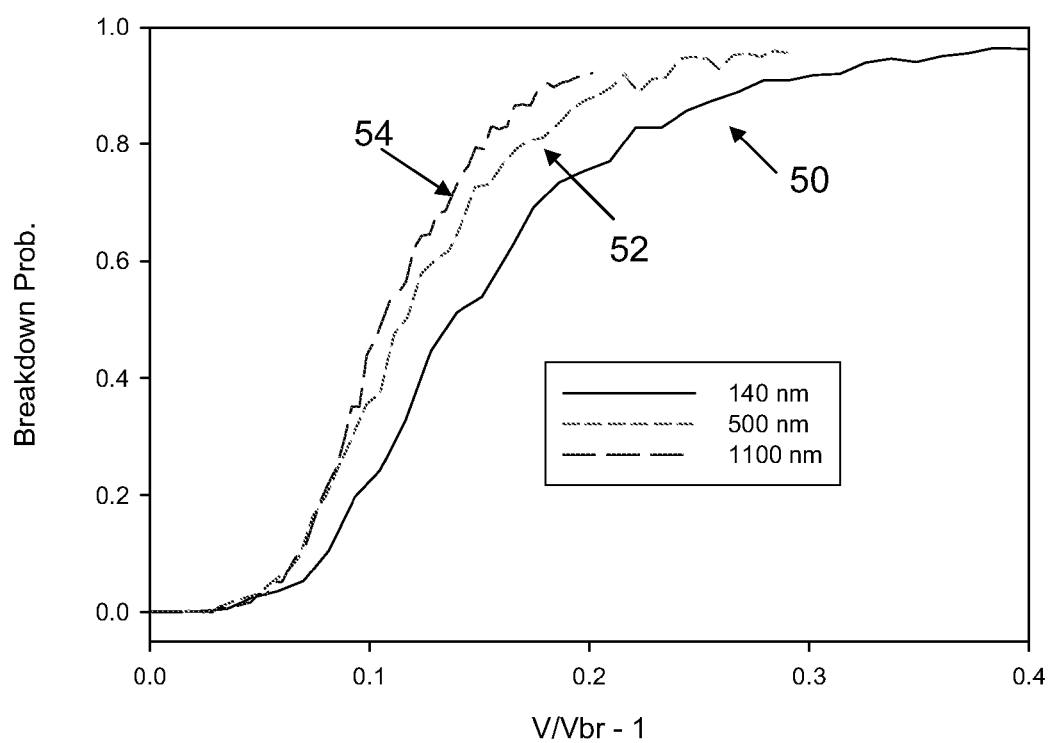
FIG. 5 illustrates simulated breakdown probabilities of the three APDs.

FIG. 4 illustrates gain curves 40, 42, 44 for three APDs simulated using a method in accordance with an embodiment of the invention. The three APDs have InAlAs depletion regions with thicknesses of 140 nm, 500 nm, and 1100 nm, respectively. FIG. 5 illustrates the breakdown probabilities 50, 52, 55 for the three APDs.

The simulations each are based on absorption of 1000 photons. In the embodiment used to generate FIG. 3, $V_{br}$ is defined by all average gain. In the embodiment in connection with FIGS. 4 and 5, a cap of max gain for an individual carrier is set to be 500,000. In this cases, $V_{br}$ is defined by the voltage at which at least one single carrier reaches the max gain of 500,000. The average gain for each thereby-defined $V_{br}$ is about 800.

In the embodiments described above, the total number of carriers being traced in the simulation can be reduced significantly, thus reducing simulation time without biasing simulation results. With an experimental setup having known quenching circuits and current measurement accuracies, Monte Carlo simulations can help understanding of breakdown behaviors of APDs. Such an intuitive understanding can help optimize designs of APD structures for Geiger-mode operations.

While the invention has been described with respect to a limited number of embodiments, those skilled in the art, having benefit of this disclosure, will appreciate that other embodiments can be advised which do not depart from the scope of the invention as disclosed herein.

For example, although examples are described with respect to simulations of APDs, other simulations can employ the methods in accordance with embodiments of the invention. For example, in the simulation of population growth, instead of tracing each individual, the total number of simulated individuals can be reduced by simulating an individual with an increased weight factor instead of the individual reproducing one or more individuals.

In simulating a market, monetary gains can be simulated by an increased weight instead of increased investment entities or seeds, or shares of stocks.

It is noted that although in the examples described with respect to APDs, the multiplication factor for an individual carrier is in integer, in simulating other systems, non-integers can be used.

What is claimed is:

1. A computer-implemented method for simulating a carrier multiplication process, comprising:
    tracing, using at least one computer, histories of a plurality of carriers, wherein the histories include a multiplication of one of the plurality of carriers to generate at least one new carrier;
    simulating, using the at least one computer, the multiplication, wherein said simulating comprises increasing a weight of at least one of the one of the plurality of carriers or the at least one new carrier; and
    summing, using the at least one computer, the weights of the plurality of carriers and the new carriers.

2. The computer-implemented method of claim 1, wherein the multiplication comprises an impact ionization in an avalanche photodiode (APD), and wherein the plurality of carriers include electrons and holes.

3. The computer-implemented method of claim 2, wherein the impact ionization is caused by an electron resulting in two electrons and one hole in the APD, wherein said simulating comprises simulating a new electron and a new hole instead of the two electrons and one hole, and wherein the new electron has a weight increase by a factor of two.

4. The computer implemented method of claim 2, wherein the impact ionization is caused by a hole in the APD, wherein said simulating comprises simulating a new hole and a new electron, and wherein the new hole has a weight increase by a factor of two.

5. The computer-implemented method of claim 2, further comprising:
   defining a breakdown voltage for the APD; and
   calculating a breakdown probability of the APD based on the defined breakdown voltage.

6. The computer-implemented method of claim 5, wherein said defining the breakdown voltage is based on one of a predetermined bias for the APD or a predetermined gain for an individual carrier.

7. The computer-implemented method of claim 2, further comprising:
   simulating an electrical current from the APD; and
   applying a simulated filter to the simulated electrical current to determine a single photo detection probability,
   wherein the simulated filter is determined from a resolution of a measurement system, and
   wherein the resolution comprises at least one of an amplitude resolution or a frequency resolution of the measurement system.

8. A non-transitory computer-readable medium having instructions stored thereon for execution by at least one computer to simulate a carrier multiplication process by performing a plurality of steps including:
   tracing histories of a plurality of carriers, wherein the histories include a multiplication of one of the plurality of carriers to generate at least one new carrier;
   simulating the multiplication, wherein said simulating comprises increasing a weight of at least one of the one of the plurality of carriers or the at least one new carrier; and
   summing the weights of the plurality of carriers and the new carriers.

9. The non-transitory computer-readable medium of claim 8, wherein the multiplication comprises an impact ionization in an avalanche photodiode (APD), and wherein the plurality of carriers include electrons and holes.

10. The non-transitory computer-readable medium of claim 9, wherein the impact ionization is caused by an electron resulting in two electrons and one hole in the APD, wherein said simulating comprises simulating a new electron and a new hole instead of the two electrons and one hole, and wherein the new electron has a weight increase by a factor of two.

11. The non-transitory computer-readable medium of claim 9, wherein the impact ionization is caused by a hole in the APD, wherein said simulating comprises simulating a new hole and a new electron, and wherein the new hole has a weight increase by a factor of two.

12. The non-transitory computer-readable medium of claim 9, wherein the plurality of steps further include:
   defining a breakdown voltage for the APD; and
   calculating a breakdown probability of the APD based on the defined breakdown voltage.

13. The non-transitory computer-readable medium of claim 12, wherein said defining the breakdown voltage is based on one of a predetermined bias for the APD or a predetermined gain for an individual carrier.

14. The non-transitory computer-readable medium of claim 9, wherein the plurality of steps further include:
   simulating an electrical current from the APD; and
   applying a simulated filter to the simulated electrical current to determine a single photo detection probability,
   wherein the simulated filter is determined from a resolution of a measurement system, and
   wherein the resolution comprises at least one of an amplitude resolution or a frequency resolution of the measurement system.

15. A computer system including at least one computer configured to simulate a carrier multiplication process, wherein the computer system is configured to:
   trace histories of a plurality of carriers, wherein the histories include a multiplication of one of the plurality of carriers to generate at least one new carrier;
   simulate the multiplication of the one of the plurality of carriers by increasing a weight of at least one of the one of the plurality of carriers or the at least one new carrier; and
   add the weights of the plurality of carriers and the new carriers.

16. The computer system of claim 15, wherein the multiplication comprises an impact ionization in an avalanche photodiode (APD), and wherein the plurality of carriers include electrons and holes.

17. The computer system of claim 16, wherein the impact ionization is caused by an electron resulting in two electrons and one hole in the APD, wherein the simulation of the multiplication comprises simulating a new electron and a new hole instead of the two electrons and one hole, and wherein the new electron has a weight increase by a factor of two.

18. The computer system of claim 16, wherein the impact ionization is caused by a hole in the APD, wherein the simulation of the multiplication comprises simulating a new hole and a new electron, and wherein the new hole has a weight increase by a factor of two.

19. The computer system of claim 16, wherein the computer system is further configured to:
   calculate a breakdown probability of the APD based on a defined breakdown voltage.

20. The computer system of claim 16, wherein the computer system is further configured to:
   simulate an electrical current from the APD; and
   apply a simulated filter to the simulated electrical current to determine a single photo detection probability,
   wherein the simulated filter is determined from a resolution of a measurement system, and
   wherein the resolution comprises at least one of an amplitude resolution or a frequency resolution of the measurement system.

* * * * *